United States Patent
Hara

(10) Patent No.: US 6,405,758 B1
(45) Date of Patent: Jun. 18, 2002

(54) VALVE DRIVING APPARATUS

(75) Inventor: Tetsuhiko Hara, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/597,417

(22) Filed: Jun. 19, 2000

(30) Foreign Application Priority Data

Jun. 18, 1999 (JP) ............................................ 11-173159

(51) Int. Cl.[7] .............................................. F16K 11/16
(52) U.S. Cl. .............................. 137/630.2; 251/129.11; 251/263
(58) Field of Search ........................ 137/625.41, 630.2; 251/129.11, 253, 254, 263

(56) References Cited

U.S. PATENT DOCUMENTS

| | | | | |
|---|---|---|---|---|
| 1,919,234 A | * | 7/1933 | Leigh ....................... | 137/630.2 |
| 2,614,851 A | * | 10/1952 | Parker ...................... | 137/630.2 |
| 2,732,859 A | * | 1/1956 | Chase ....................... | 137/625.41 |
| 4,177,949 A | | 12/1979 | Curtis et al. ............... | 239/582 |
| 4,220,175 A | * | 9/1980 | Keller, III et al. ......... | 137/454.6 |
| 4,570,663 A | * | 2/1986 | Gould et al. ............... | 137/119.07 |
| 4,930,746 A | | 6/1990 | Reinicke et al. ........... | 251/129.11 |
| 4,957,137 A | | 9/1990 | Wang ....................... | 137/549 |
| 5,007,446 A | * | 4/1991 | Grove ...................... | 137/72 |
| 6,053,472 A | * | 4/2000 | DeLand .................... | 251/129.11 |

FOREIGN PATENT DOCUMENTS

| | | | | |
|---|---|---|---|---|
| GB | 2 336 420 | | 10/1999 | ........... F16K/3/316 |
| WO | 97/30616 | | 8/1997 | ........... A47J/27/09 |

* cited by examiner

Primary Examiner—John Fox
(74) Attorney, Agent, or Firm—Sughrue Mion, PLLC

(57) ABSTRACT

A valve driving apparatus includes a main body coupled with an inflow tube for introducing a fluid internally and a discharge tube for discharging the fluid. Valve members are movable within a predetermined range, for permitting the opening or the closing of apertures connected to one of the inflow tube and the discharge tube which is coupled with the main body. A driver drives the valve members, and the driver includes cam members having cam faces used for operating the valve members and a drive source for driving the cam members, wherein the valve members are operated by rotating the cam members to open the close the apertures.

11 Claims, 7 Drawing Sheets

VALVE DRIVING APPARATUS

BACKGROUND OF INVENTION

1. Field of the Invention

The present invention relates to an improved valve driving apparatus that employs a drive source, such as a motor, to drive a valve that is formed of a spherical member that opens or closes a flow path.

2. Related Art

As conventional apparatuses for opening or for closing refrigerant flow paths, which are used for refrigerators or for air conditioners to adjust the temperatures in chambers that communicate with the flow paths, presently available valve driving apparatuses employ solenoid valves (see JP-A-62-288780) or needle valves as opening and closing valves.

However, the valve opening and closing operations performed by a valve driving apparatus for which a solenoid is employed are very noisy. And since regardless of whether a solenoid is open or closed, to maintain an existing state the solenoid must remain conductive at all times, another problem with a solenoid apparatus is related to the power it consumes. As another drawback, a valve driving apparatus that uses a solenoid is so designed that both valves can not simultaneously be held open, or closed.

The valve driving apparatus that employs the needle valves uses a stepping motor, for example, as a drive source, and converts the rotational force of the stepping motor into a thrusting force for a needle valve to open and close a flow path. Of course, when compared with a valve driving apparatus that uses a solenoid, a valve driving apparatus that uses needle valves produces less noise when operating.

Since the valve driving apparatus that uses needle valves must normally convert the rotational force produced by the stepping motor into a thrusting force for a needle valve, screw threads that engage each other are provided along the outer surface of the rotary shaft of the motor and the inner surface of a cylindrical member positioned around the rotary shaft. As the rotary shaft of the motor is rotated while engaging the cylindrical member, the rotor of the motor moves linearly along the cylindrical member, and as a result, the needle valve, which is attached to the distal end of the output shaft of the motor, moves linearly with the output shaft. This linear movement of the needle valve opens or closes an aperture.

However, for the valve driving apparatus using the needle valve, generally, one motor corresponds to one needle valve, so that a plurality of valves can not be operated by a single motor. That is, a valve driving apparatus that uses needle valves is not appropriate for a three-way valve or a four-way valve that has a plurality of flow paths (Apertures). In addition, for a valve driving apparatus that employs needle valves, it is technically difficult to form the screw threads for the cylindrical member and the output shaft. In other words, in order to smoothly rotate the output shaft of the motor while engaging the cylindrical member, the screw threads in the cylindrical member and the screw threads in the output shaft must be machined very precisely. Further, a precise process is required to align the center position of a needle valve, which is attached to the distal end of the rotary shaft of the motor, and the center position of a flow path (an aperture) into which the needle valve is to be. inserted. Therefore, a high-degree of technical skill and experience are required for the assembly of such a valve driving apparatus.

SUMMARY OF INVENTION

It is, therefore, one objective of the present invention to provide a valve driving apparatus that can be applied for a three-way valve and a four-way valve, while complex skills and experience, such as are required for precise screw thread machining and the aligning of the center positions of a valve and an aperture, are not required.

An aspect of the present invention, there is provided a valve driving apparatus includes a main body coupled with an inflow tube for introducing a fluid internally and a discharge tube for discharging said fluid, valve members movable within a predetermined range, said valve members permitting the opening or the closing of apertures connected to one of said inflow tube and said discharge tube which is coupled with said main body, a driver for driving said valve members, said driver including cam members having cam faces used for operating said valve members and a drive source for driving said cam members, wherein said valve members are operated by rotating said cam members to open and close said apertures.

According to the present invention, the valve driving apparatus of the invention includes a cam member that has a cam face as a driver, and valve members are moved by the cam face of the cam member so as to open or close apertures in the main body. Thus, the screw threads that are used for a conventional valve driver are not required, and as a result, complicated operations, such as the precise machining of screw threads and the aligning of the center positions of valve members and apertures, are not required, and a simple structure can be provided whereby: the apertures can be opened and closed by the valve members. Therefore, not only the number of required parts but also manufacturing expenditures, such as assembly costs, can be reduced, and mass production can be used to produce inexpensive valve driving apparatuses.

DETAILED DESCRIPTION OF PREFERRED EMBODIMENTS

First Embodiment

A valve driving apparatus according to a first embodiment of the present invention will now be described while referring to FIGS. 1 to 4.

Figure 1:
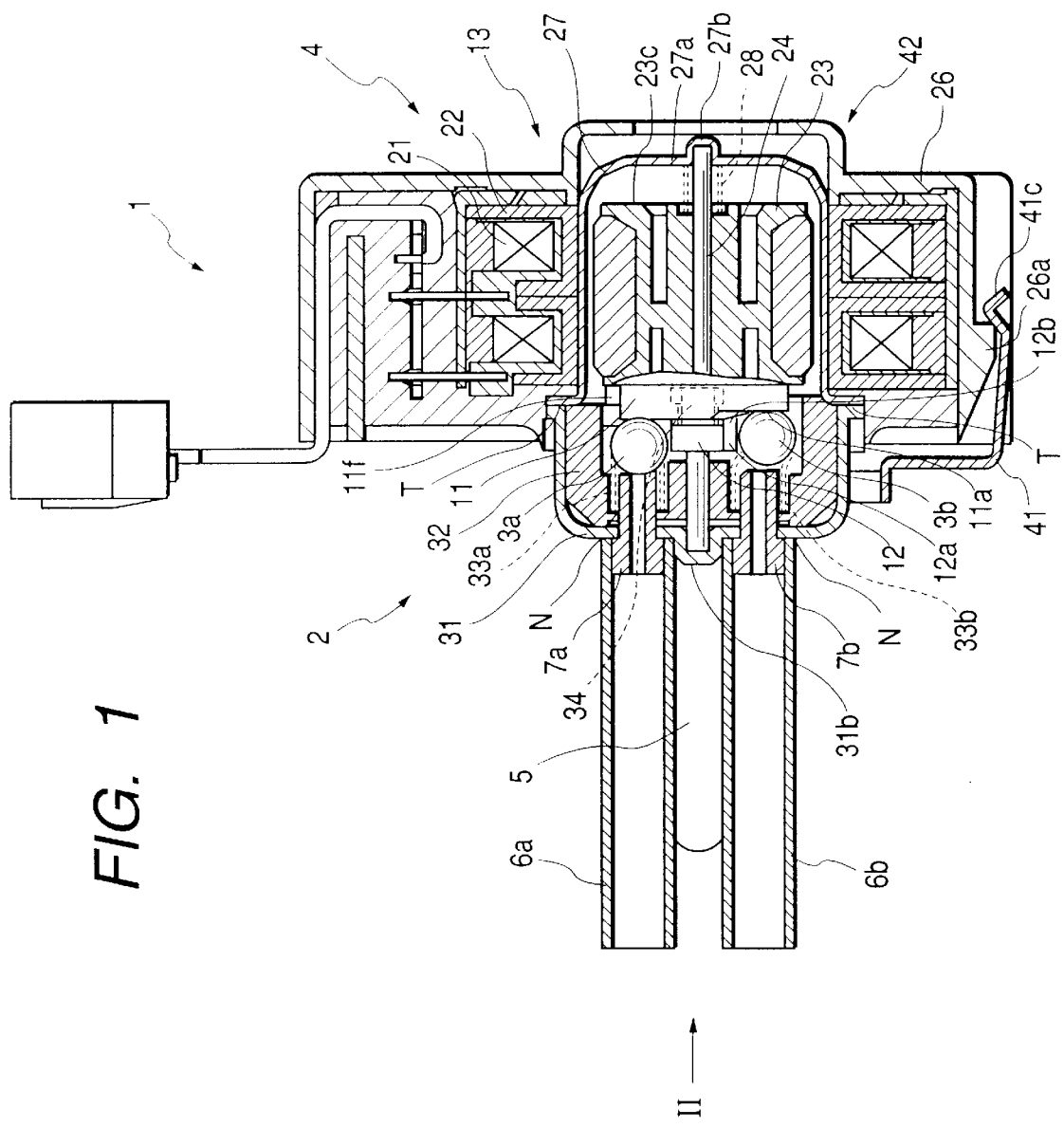
FIG. 1 is a vertical cross-sectional view of a valve driving apparatus according to a first embodiment of the present invention.
Figure 2:
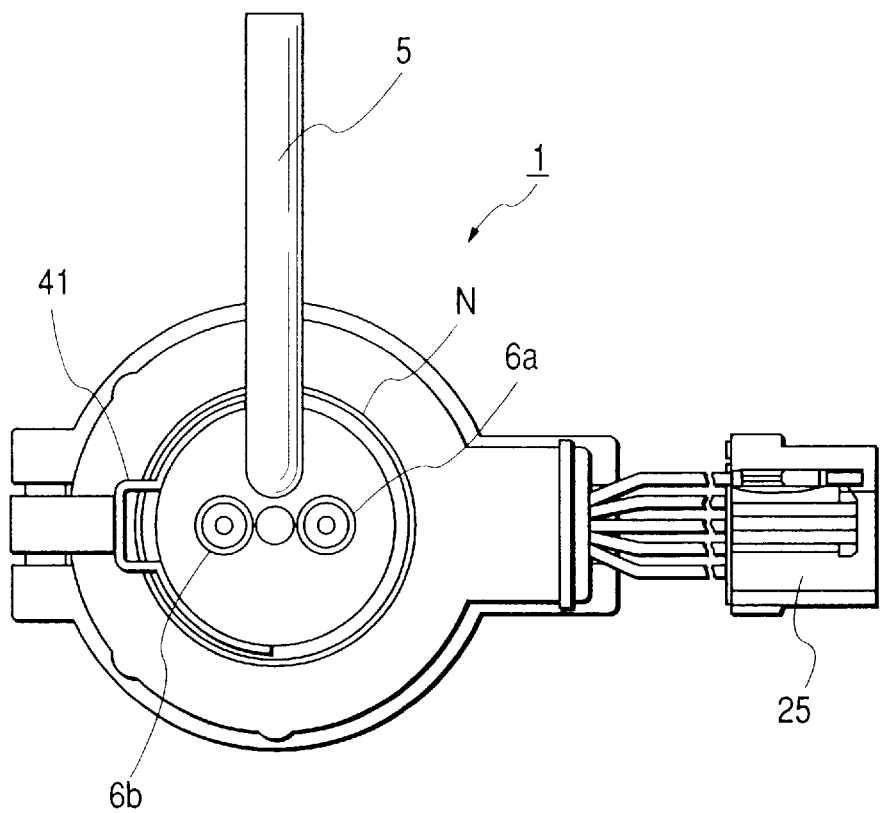
FIG. 2 is a side view of the valve driving apparatus in FIG. 1 viewed from the direction indicated by an arrow II.

As is shown in FIGS. 1 and 2, a valve driving apparatus 1 roughly includes: a main body 2, two spherical members 3a and 3b, which serve as valves, and a driver 4, for driving the spherical members 3a and 3b. The main body 2 is connected to an inflow tube for introducing a fluid, and to two discharge tubes 6a and 6b for discharging the fluid.

In this embodiment, cylindrical valve members 7a and 7b, each of which is pierced with a center hole, are installed at two apertures, i.e., at the portions where the discharge tubes 6a and 6b are connected to the main body 2.

When the valve members 7a and 7b are opened and closed by the spherical members 3a and 3b, the apertures between the main body 2 and the discharge tubes 6a and 6b, i.e., the center holes, are likewise opened and closed. In this embodiment, the apertures in the main body 2, into which the valve members 7a and 7b are fitted, are positioned relative to a rotary shaft 24, which will be described later, at an angle of 180 degrees in the axial direction. The arrangement of the main body 2 will also be described later.

The driver 4 includes: a first cam member 11 having a cam face 11a at one end, and a second cam member 12 having a cam face 12a around its circumference; and a stepping motor 13, which is a drive source that rotates the first and second cam members 11 and 12 that move, within a predetermined range, the spherical members 3a and 3b in the main body 2.

The stepping motor 13 includes: a stator 22, around which a coil 21 is wound; a rotor 23, which is positioned opposite and inside the stator 22; and the rotary shaft 24, which is inserted into the rotation axis portion of the rotor 23.

The stator 22 is retained inside the stator storage member 26, which is detachably secured to the main body 2 by a holder 41, which will be described later. The stator 22 is so designed that using a resin the coil 21 is integrally formed with the polar teeth of the stator 22 and sealed.

For the rotor 23, a magnet is inserted into a resin material, which is composed of PBT (polybutylene terephthalate), and is positioned opposite the stator 22. Then, the center portion is fitted around the rotary shaft 24, which constitutes the rotational axis for the cam members 11 and 12. The rotor 23 is stored in a rotor storage member 27 made of SUS, which spatially defines the stator 22 and the rotor 23. One end of the rotary shaft inserted into the rotor 23 is supported by a recessed bearing 27b that is formed at the center of the bottom 27a of the rotor storage member 27. The other end of the rotary shaft 24 is supported by a recessed bearing 31b that is formed in the center of an external frame 31, made of SUS, of the main body 2.

An end face 23c of the rotor 23 is located opposite the bottom 27a of the rotor storage member 27. An urging spring 28 is provided between the end face 23c and the bottom 27a of the rotor storage member 27, and urges the rotor 23 toward the main body 2. Thus, the rotor 23 is rotated while being driven toward the main body 2. At this time, using the force provided by the urging spring 28, a projection 11c drives a valve 3 toward the apertures of the valve members 7a and 7b. One function of the urging spring 28 is to absorb errors in the sizes of parts, and to ensure that the ends of the valve members 7a and 7b are completely closed by the spherical members 3a and 3b.

The first cam member 11 and the second cam member 12 are integrally formed at the other end of the rotor 23. A cam face 11a formed at one end of the first cam member 11 is positioned opposite the cylindrical valve members 7a and 7b, which are fitted into the apertures in the main body 2. The spherical members 3a and 3b, which open or close the valve members 7a and 7b, are provided between the cam face 11 of the first cam member 11 and the valve members 7a and 7b. When the rotor 23 is driven toward the main body 2 by the urging spring 28, the cam face 1a contacts the spherical members 3a and 3b, which are then urged toward the main body 2.

The second cam member 12 is located in the radial direction relative to the spherical members 3a and 3b, which are positioned at an angle of 180 degrees to the axial direction of the rotary shaft 24. A cam face 12a, which is formed around the circumference of the second cam member 12, contacts the spherical members 3a and 3b. When the cam members 11 and 12 rotate with the rotor 23, the spherical members 3a and 3b move along the surfaces of the cam faces 11a and 12a in the axial direction of the rotary shaft 24 and perpendicularly, opening and closing the valve members 7a and 7b.

The spherical members 3a and 3b, which are moved in this manner by the cam faces 11a and 12a, are brought into contact with the ends of urging members, coil springs 33a and 33b. These coil springs 33a and 33b are fitted around the outer surface of the cylindrical valve members 7a and 7b in valve storage holes 35a and 35b (see FIG. 4) in a guide member 32 of the main body 2, which will be described later. The distal ends of the coil springs 33a and 33b project outward past the distal ends of the valve members 7a and 7b and contact the spherical members 3a and 3b.

With this arrangement, the spherical members 3a and 3b are constantly urged toward the cam face 11a by the force exerted by the coil springs 33a and 33b. When the valve members 7a and 7b are opened, the spherical members 3a and 3b are separated from the valve members 7a and 7b by the urging force exerted by the coil springs 33a and 33b. In addition, the thus arranged components ensure that the spherical members 3a and 3b constantly contact and precisely move along the surface of the cam face 11a.

Furthermore, when the spherical members 3a and 3b are moved toward the outside by a projection 12b on the cam face 12a of the second cam member 12 (are pushed toward the outside in a direction perpendicular to the axial direction of the rotary shaft 24), the coil springs 33a and 33b return the spherical members 3a and 3b to their original positions. That is, when the spherical members 3a and 3b are separated from the projection 12b as the second cam member 12 is rotated, the coil sprigs springs 33a and 33b are extended and return the spherical members 3a and 3b to their original positions, immediately adjacent to the valve members 7a and 7b. The coil springs 33a and 33b also function to prevent the vibration of the corresponding spherical members 3a and 3b.

The rotor storage member 27 is made of SUS, as is described above, and using TIG (tungsten inert gas) welding (a welded portion in FIG. 1 is denoted by a T), is integrally formed with the external frame 31 of the main body, which is also made of SUS. Then, a case 42 is fitted over the assembly to seal in fluid. Since generally for a conventional valve driving apparatus for refrigerant the main body is made of brass and the rotor storage member is made of SUS, brazing must be performed at portions where the two members are bonded. However, the brazing must be performed manually, so that a great deal of labor is required. If brazing is performed automatically in a hydrogen reduction furnace, a lead gas may be generated from the bass portion, and cracks may occur in the other welded portion.

Since, for the valve driving apparatus 1 in this embodiment, the rotor storage member 27 and the external frame 31 are both made of SUS, as is described above, bonding of the two members to each other can easily be accomplished using TIG welding. Accordingly, the above described problem does not occur.

The cam face 11a of the first cam member 11 impels the spherical members 3a and 3b toward the valve members 7a and 7b, and brings them into contact with the apertures (the ends of the valve members 7a and 7b) so that the apertures are closed. Also, to open the apertures the cam face 11a separates the spherical members 3a and 3b from the valve members 7a and 7b.

Figure 3A:
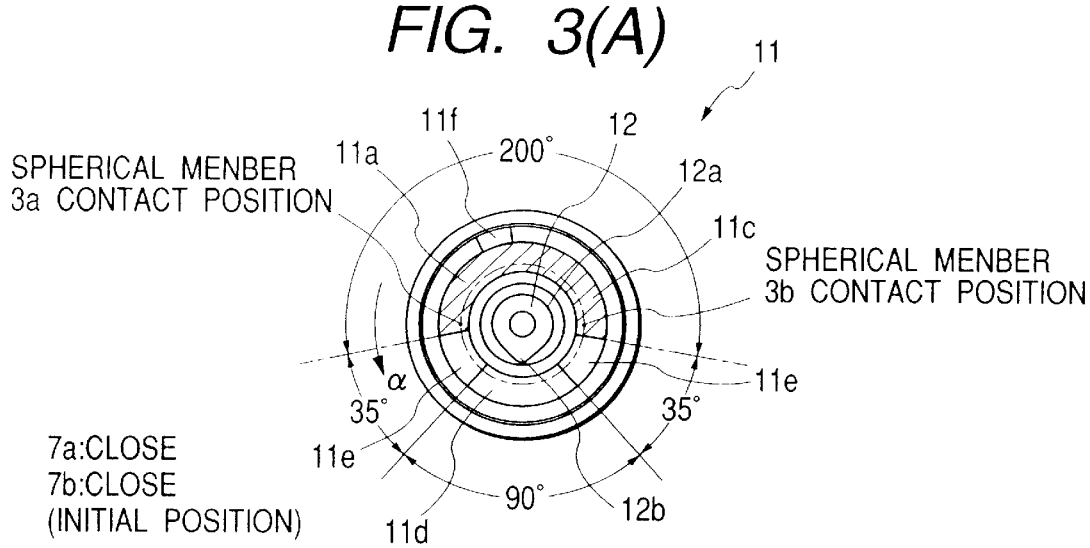
FIGS. 3 (A) to (C) are diagrams of the first cam member of the valve driving apparatus in FIG. 1 viewed from the direction indicated by the arrow II, with FIG. 3A showing the first cam member in a first mode in which it is positioned at the origin.
FIG. 3B showing the first cam member in a second mode in which it has been rotated 90 degrees from the origin in the direction indicated by an arrow α.
FIG. 3C showing the first cam member in a third mode in which it has been rotated 270 degrees from the origin in the direction indicated by the arrow α.
Figure 3B:
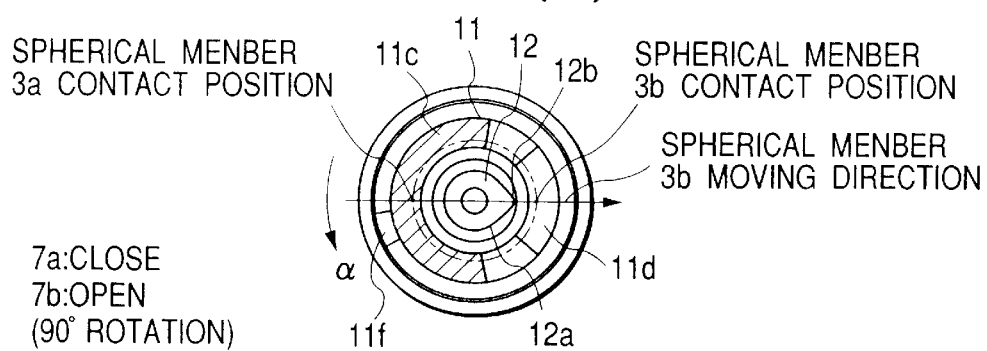
Figure 3C:
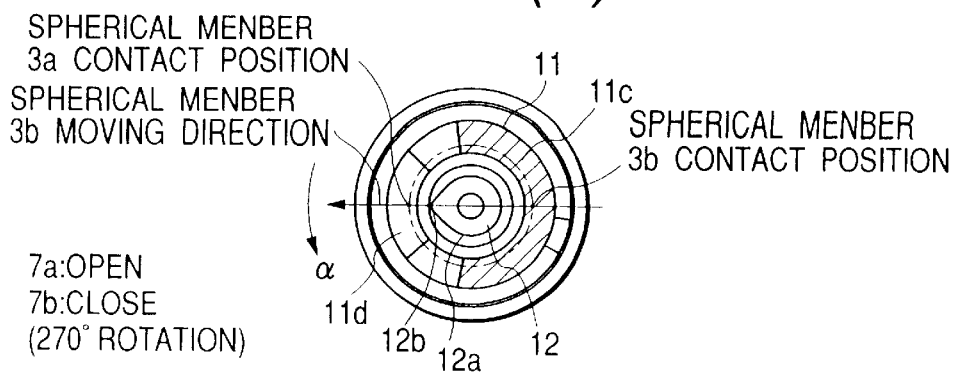

As is shown in FIGS. 3A to 3C, the cam face 11a includes: a projection 11c, for moving the spherical members 3a and 3b in the direction in which the apertures are closed; a low face portion 11d, for moving the spherical members 3a and 3b in the direction in which the apertures are opened; and two inclined surfaces 11e, which connect the projection 11c and the low face portion 11d. The projection 11c and the low face portion 11d are respectively raised and recessed in the same direction as the rotary shaft 24 rotates. As is shown in FIGS. 3A to 3C, the projection 11c of the cam face 11a is formed within a range spanning approximately 200 degrees of the 360 degrees of the cam face 11a. In this embodiment, the projection 11c is higher by 0.7 mm than the low face portion 11d; however, this is an arbitrary difference. When the spherical members 3a and 3b are positioned opposite the projection 11c, they are forced against the valve members 7a and 7b and close the apertures.

The low face portion 11d is formed within a range spanning approximately 90 degrees of the remaining 160 degrees on the cam face 11a. When the spherical members 3a and 3b are located opposite the low face portion 11d, they are separated from the valve members 7a and 7b, and the apertures of the main body 2 are opened. The inclined surfaces 11e are each formed within a range spanning approximately 35 degrees.

A raised portion 11f for controlling the rotation of the rotor 23 is formed on the outer surface of the first cam member 11, and extends outward radially. The raised portion 11f is so located that it can contact a rotation stopper protrusion 34 that is formed on a portion located opposite the outer face of the first cam member 11 of the main body 2. In this embodiment, contact between the raised portion 11f and the rotation stopper protrusion 34 is used to position the apparatus at the operation origin. The operation start point is determined by driving the stepping motor 13 at the operation origin a number of predetermined steps, to control the opening and closing of the valve members 7a and 7b. The origin positioning operation may be performed each time the operation of the apparatus is initiated, or it may be performed once every several hours.

When the rotor is rotated to a predetermined position in the opposite direction, the raised portion 11f also contacts the rotation stopper protrusion 34. The raised portion 11f is formed within a range spanning 20 degrees of the circumferential face of the first cam member 11. The protrusion 34 is also formed within a range spanning 20 degrees of the main body 2. Thus, the rotor 23 can be rotated within a range spanning 320 degrees.

Since the spherical members 3a and 3b open or close the valve members 7a and 7b as the rotor 23 is rotated within a range spanning 320 degrees, the valve driving apparatus 1 of this embodiment can set the three states of the valve members 7a and 7b, i.e., a first mode in which the two valves 7a and 7b are closed, and second and third modes in which one of the valves 7a and 7b is open and the other is closed.

In the first mode shown in FIG. 3A, near both ends of the projection 11c, the spherical members 3a and 3b are driven upward to the valve members 7a and 7b and close them. The first mode in FIG. 3A represents the state wherein the raised portion 11f is brought into contact with the rotation stopper protrusion 34, and the origin positioning is performed.

In the second mode shown in FIG. 3B, the projection 11c is brought into contact with the spherical member 3a to close the valve 7a, and the low portion 11d is brought into contact with the spherical member 3b, which is then separated from the valve member 7b so that the valve member 7b is opened. The second mode in FIG. 3B represents the state wherein the first cam member 11 in the first mode is rotated 90 degrees in the direction indicated by an arrow α.

In the third mode shown in FIG. 3C, the first cam member 11 in the second mode is rotated 180 degrees (270 degrees from the origin), i.e., the projection 11c and the low portion 11d are brought into contact with the spherical members 3a and 3b, respectively, so that the spherical member 3b closes the valve member 7b, and the spherical member 3a is separated from and opens the valve member 7a.

The second cam member 12 is positioned along the same axis as the first cam member 11, is supported by the rotary shaft 24, and, as is the first cam member 11, is rotated with the rotor 23. A projection 12b, which is formed on the circumferential face of the second cam member 12, is extended outward toward the surface, at an angle that substantially matches the center of the low face portion 11d of the first cam member 11.

When the spherical members 3a and 3b are opposite the low face portion 11d of the cam face 11a of the first cam member 11, the thus structured second cam member 12 drives the spherical members 3a and 3b toward the outside. With this arrangement, when the spherical members 3a and 3b are opposite the low face portion 11d and are at a distance from the valve members 7a and 7b, the spherical members 3a and 3b are moved by the cam face 12a of the second cam member 12 in the direction perpendicular to the direction in which the apertures are opened and closed (to the left and right in FIG. 1). That is, the second cam member 12 serves as means for moving towards the outside the spherical members 3a and 3b. As a result, it is ensured that the spherical members 3a and 3b will open the apertures of the valve members 7a and 7b.

In the first embodiment, the main body 2 is constituted by a cylindrically shaped SUS outer frame 31 that has a bottom, a brass guide member 32 that is fitted into the external frame 31, and the valve members 7a and 7b. The outer frame 31 is a cylinder that has a bottom, formed by throttle machining, in which three apertures are formed. In the three apertures, an inflow tube 5 and discharge tubes 6a and 6b are bonded by nickel brazing (bonded portions in FIGS. 1 and 2 are denoted by Ns). In addition, formed in the center of the bottom of the outer frame 31 is a recessed bearing 31b that rotatably supports one end of the rotary shaft 24 of the stepping motor 13, which will be described later.

Figure 4A:
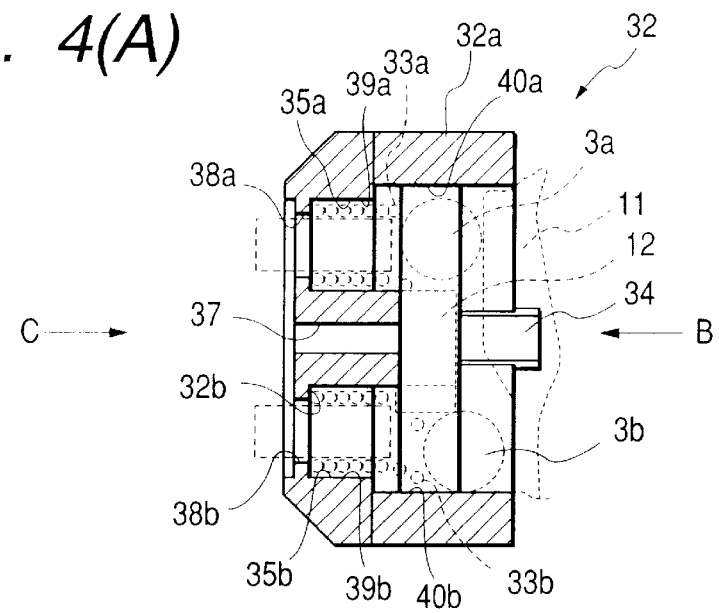
FIGS. 4 (A) to (C) are diagrams showing the guide member of the-valve driving apparatus in FIG. 1, with FIG. 4A being a cross-sectional view viewed from the same direction as in FIG. 1.
FIG. 4B being a diagram viewed from the direction indicated by an arrow B.
FIG. 4C being a diagram viewed from the direction indicated by an arrow C.
Figure 4B:
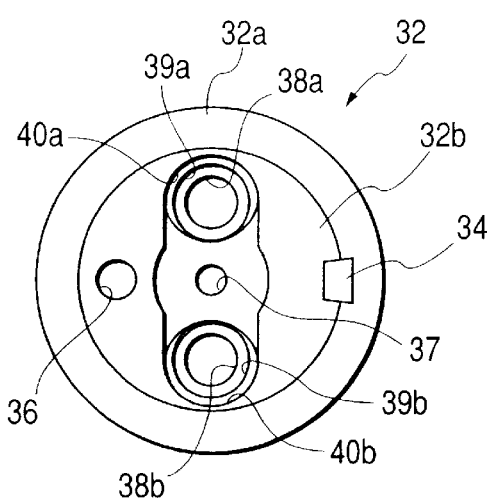
Figure 4C:
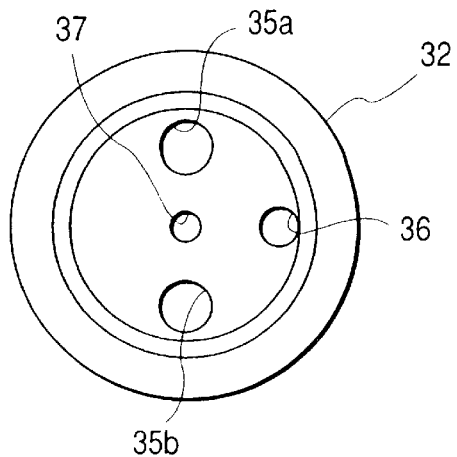

The guide member 32 employs the range within which the two spherical members 3a and 3b move as a predetermined range. As is shown in FIGS. 4A to 4C, the guide member 32 is substantially cup shaped and includes a cylindrical side wall 32a and a bottom 32b. The guide member 32 is fitted into the outer frame 31 in the fit drive state. In this embodiment, the guide member 32 is formed of brass, but it may be made of a resin, such as PBT.

In order to control the rotation of the rotor 23, the rotation stopper protrusion 34 is provided inside the side wall 32a, and can contact the raised portion 11f that is formed on the outer face of the first cam member 11.

Further, valve storage holes 35a and 35b, into which the valve members 7a and 7b are inserted and fixed, a through hole 36, which communicates with the inflow tube 5, and a hole 37, into which the rotary shaft 24 is inserted, are provided for the bottom 32b. The holes 35a, 35b, 36 and 37 are located at positions whereat they are aligned with the holes that are formed in the outer member 31.

The valve storage holes 35a and 35b include small holes 38a and 38b, into which the valve members 7a and 7b are inserted and fixed, and large holes 39a and 39b, which communicate with the small holes 38a and 38b. The ends of the valve members 7a and 7b are passed through the guide member 32 and the outer frame 31 and project outward into the discharge tubes 6a and 6b outside the main body 2, while their other ends are fixed under pressure in the small holes 38a and 38b, so that they project slightly beyond the ends of the large holes 39a and 39b. A slight gap. is thus defined between the outer faces of the valve members 7a and 7b in the large holes 39a and 39b, and the internal walls of the large holes 39a and 39b. This gap is used as the mounting space for the coil springs 33a and 33b, which are fitted around the valve members 7a and 7b.

Furthermore, guide holes 40a and 40b are continuously formed in the large holes 39a and 39b in order to regulate the range within which the spherical members 3a and 3b are moved. The guide holes 40a and 40b, which are substantially elliptical in shape, are extended toward the outside relative to the center positions of the center holes in the valve members 7a and 7b. Therefore, when the spherical members 3a and 3b are forced outward by the second cam member 12, they follow the guide holes 40a and 40b as they move outward.

The center holes of the valve members 7a and 7b are so shaped that the apertures can be completely closed when the spherical members 3a and 3b contact the valve members 7a and 7b. That is, the apertures of the valve members 7a and 7b that are opposite the spherical members 3a and 3b have arc-shaped receiving faces that are shaped substantially the same as are the spherical members 3a and 3b.

When the stator storage member 26 is attached to the main body 2, the stator storage member 26 is detachably secured to the main body 2 by a flexible holder 41. A step portion 26a, which is formed on the stator storage member 26, engages an engagement pawl 41c that is formed at the distal end of the holder 41.

The holder 41 is so provided that the flexible force it exerts is sufficient to securely hold the main body 2. At this time, since a protrusion (not shown) is embedded in the main body 2, the main body 2 can not move in the circumferential direction and is held securely.

When the stator storage member 26 is to be mounted on the main body 2 while the holder 41 is attached to the main body 2, the stator storage member 26, which is already bonded to the main body 2, is inserted into the center space of the stator storage member 26, and the stator storage member 26 is slid toward the main body 2.

As a result, the flexible force exerted by the engagement pawl 41c of the holder 41 is forced inward over the step 26a formed in the stator storage member 26, securing the stator storage member 26 to the main body 2. It should be noted that the stator storage member 26 can be removed from the main body 2 by pulling strongly on it in the direction in which it is separated from the main body 2.

Since the stator storage member 26 can be attached to or detached from the main body 2 simply by pushing or pulling the member 26, maintenance of the stator 22, the coil 21 and a power supply unit 25, which is connected to these components, can be conveniently performed.

Next, an explanation will be given for the valve opening/closing operation of the thus arranged valve driving apparatus 1 of the first embodiment.

First, when the apparatus 1 is mounted at a predetermined location, such as along a refrigerant path, the stepping motor 13 is driven a number of predetermined steps, and is positioned at the origin. That is, in FIGS. 3A to 3C, the rotor 23 is rotated the predetermined steps (full steps for a rotation of 320 degrees), in the direction opposite to that indicated by the arrow α, until the rotor 23 is at the origin. Then, the raised portion 11f formed on the circumferential face of the first cam member 11 contacts the rotation stopper protrusion 34 that is formed on the side of the main body 2. This position is defined as the position of the origin.

In this case, at the position of the origin, the first mode is set, i.e., the valve members 7a and 7b are closed by the spherical members 3a and 3b (see FIG. 3A). When the second mode is to be set, i.e., when the discharge tube 6b side is to be opened while the discharge tube 6a side is to remain closed, the rotor 23 is driven as follows.

When the rotor 23 in FIG. 3a is rotated 90 degrees from the origin in the direction indicated by the arrow α, the first and the second cam members 11 and 12 are rotated with the rotor 23, and the state in FIG. 3b is obtained. From the first mode. to the second mode, contact with the projection 11c of the first cam member 11 is maintained by the spherical member 3a, which is forced against the valve member 7a. Thus, the closed state of the valve member 7a is maintained, and no fluid flows to the discharge tube 6a.

On the other hand, when the rotor 23 is rotated another 90 degrees, the spherical member 3b is removed from the projection 11c, and is brought into contact with the low face portion 11d. During this process, the spherical member 3b is separated from the valve member 7b by the force exerted by the coil spring 33b, and since the valve member 7b is thereby released, fluid flows into the discharge tube 6b.

In the second mode, the spherical member 3b contacts the low face portion 11d, and is driven toward the outside (to the right in FIG. 3B) by the projection 12b on the second cam member 12, which is rotated together with the first cam member 11. Therefore, when the force produced by the coil spring 33b is exerted against the spherical member 3b, it is separated from the valve member 7b and the valve member 7b is released. During this process, the rotor 23 is rotated 90 degrees from the origin, and the first mode is changed to the second mode in which the valve member 7a is closed and blocks the discharge tube 6a side, and the valve member 7b is open and does not block the discharge tube 6b side.

When the second mode is to be shifted to the third mode, which provides a state opposite to that of the second mode, i.e., in which the discharge tube 6a side is open and the discharge tube 6b side is closed, the rotor 23 is driven as follows.

When the rotor 23 is rotated from the second state (the state wherein the rotor 213 has been rotated 90 degrees from the origin) 180 degrees in the direction indicated by the arrow α, the first and the second cam members 11 and 12 are rotated with the rotor 23, and the third node in FIG. 3C is entered.

In the third mode, the spherical member 3a is released from the projection 11c of the first cam member 11, and is brought into contact with the low face portion 11d. Thereafter, the spherical member 3a is separated from the valve member 7a by the force exerted by the coil spring 33a, and the valve member 7a is therefor opened. Thus, fluid flows into the discharge tube 6a.

At this time, the spherical member 3a is driven towards the outside (to the left in FIG. 3C) by the projection 12b on the second cam member 12 that is rotated with the first cam member 11. Therefore, even when the force of the coil spring 33a is exerted against the spherical member 3a, the spherical member 3a can be separated from the valve member 7a by the second cam member 12, and the valve member 7a can be opened.

On the other hand, the spherical member 3b contacts the projection 11c and accordingly is brought into contact with the valve member 7b and blocks it, so that fluid does not flow to the discharge tube 6b.

As is described above, when the rotor. 23. is rotated 270 degrees from the origin, the second mode is changed to the third mode in which the valve member 7a is released to open the discharge tube 6a, and the valve member 7b is closed to block the discharge tube 6b.

To return from the third mode to the first mode, the rotor 23 need only be rotated about 270 degrees in the opposite direction. Since the raised portion 11f of the first cam member 11 strikes the protrusion 34 of the main body 2 when the rotor 23 is rotated 270 degrees, the rotor 23 may be rotated only 260 degrees to prevent this contact. When this state is to be shifted to the second mode, the rotor 23 in the first mode is rotated 10 degrees less than for the above operation, i.e., 80 degrees.

Second Embodiment

Figure 5:
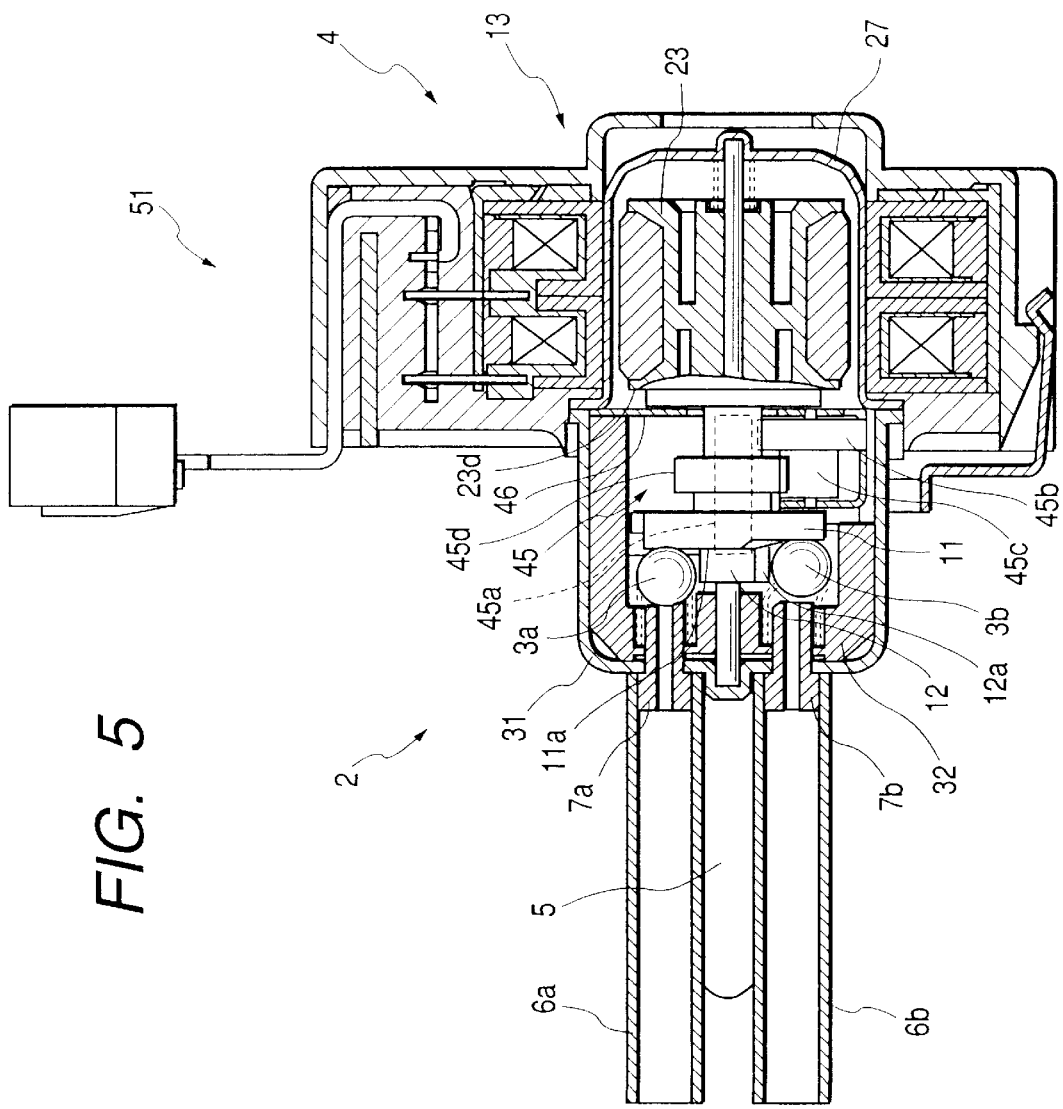
FIG. 5 is a vertical cross-sectional view of a valve driving apparatus according to a second embodiment of the invention.
Figure 6:
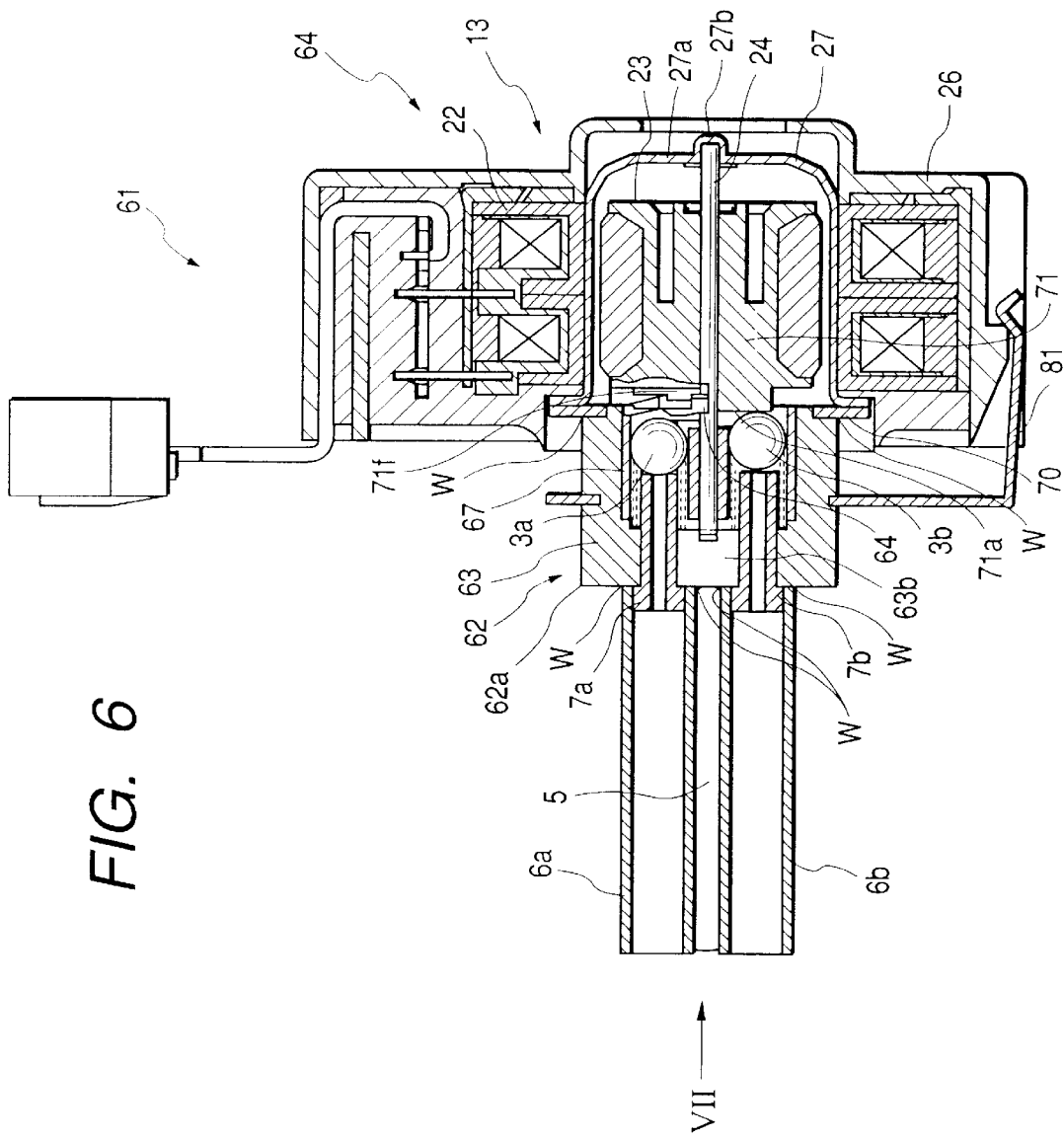
FIG. 6 is a vertical cross-sectional view of a valve driving apparatus according to a third embodiment of the invention.

A valve driving apparatus according to a second embodiment of the present invention will now be described while referring to FIG. 5. The valve driving apparatus for the second embodiment is the same as that for the first embodiment, with the exception that a speed reduction gear train 45 is provided between a stepping motor 13 and first and second cam members 11 and 12. Therefore, only the portion that is different will be described. Furthermore, the same reference numerals as are used in the first embodiment are also used in this embodiment to denote corresponding components.

The speed reduction gear train 45 includes: an end gear 45a, which is integrally formed with an end face 23d of a rotor 23 of a stepping motor 13; a first reduction gear 45b, which engages the end gear 45a; a pinion gear 45c, which is integrally formed with the first reduction gear 45b; and a second reduction gear 45d, which engages the pinion gear 45c. The second reduction gear 45d is integrally formed with the first and the second cam members 11 and 12, and in this embodiment, a base plate 46 is sandwiched between a rotor storage member 27 and a guide member 32 of a main body 2. The base plate 46 is formed by bending a part of its outer circumferential end, and this bent portion is employed to support both sides of a shaft that supports in turn the first reduction gear 45b and the pinion gear 45c.

Since the thus arranged speed reduction gear train 45 is provided, the rotation of the rotor 23 is transmitted via the first reduction gear 45b, the pinion gear 45c and the second reduction gear 45d to the first and the second cam members 11 and 12, while the rotational speed is reduced. Therefore, the first and the second cam members 11 and 12 are rotated at a lower speed than the rotation of the rotor 23 and at a stronger torque. Thus, compared with the valve driving apparatus 1 of the first embodiment, the drive torques of the first and the second cam members 11 and 12, for moving the spherical members 3a and 3b, are increased, and the proper opening and closing of the valve members 7a and 7b is better ensured. Further,.when the same torque as is used by the valve driving apparatus 1 of the first embodiment is employed to open and close the valve members 7a and 7b, the motor torque can be reduced, so that the stepping motor 13 can be compactly made.

Third Embodiment

A valve driving apparatus according to a third embodiment of the present invention will now be described while referring to FIGS. 6 and 7A to 7C. Since the arrangement of the stepping motor for this embodiment is the same as that for the first embodiment, no explanation for it will be given. Further, the same reference numerals as are used for the first embodiment are also used for this embodiment to denote corresponding components.

A valve driving apparatus 61 for the third embodiment, as well as the valve driving apparatus 1 in FIG. 1, roughly includes: a main body 62; two spherical members 3a and 3b, which serve as valves; and a driver 64, for driving the spherical members 3a and 3b.

The driver 64 rotates a cam member 71, which has a cam face 71a on one end, and a stepping motor 13, which serves as a drive source for rotating the cam member 71 and moving the spherical members 3a and 3b inside the main body 62 within a predetermined range. The cam member 71 is integrally formed with the end face of the stepping motor 13.

Figure 7A:
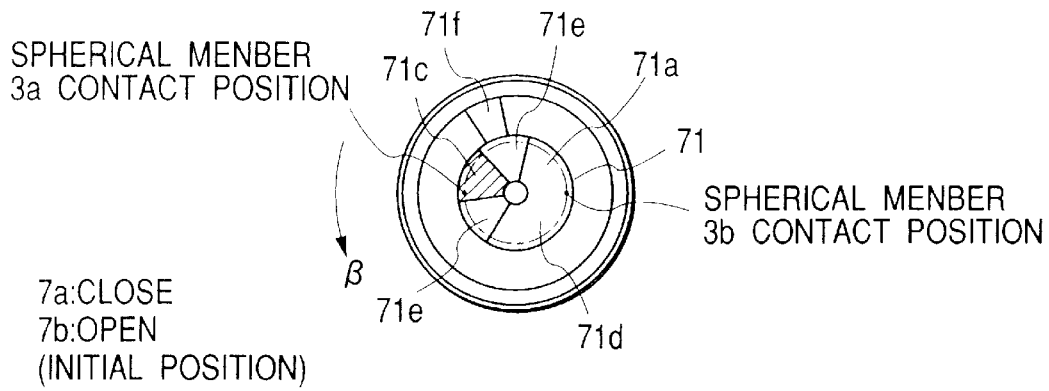
FIGS. 7 (A) to (C) are diagrams of the cam member of the valve driving apparatus in FIG. 6 viewed from the direction indicated by the arrow VII, with FIG. 7A showing the cam member in a first mode in which it is positioned at the origin.
FIG. 7B showing the cam member in a second mode in which it has been rotated 110 degrees from the origin in the direction indicated by an arrow β.
FIG. 7C showing the cam member in a third mode in which it has been rotated 200 degrees from the origin in the direction indicated by the arrow β.
Figure 7B:
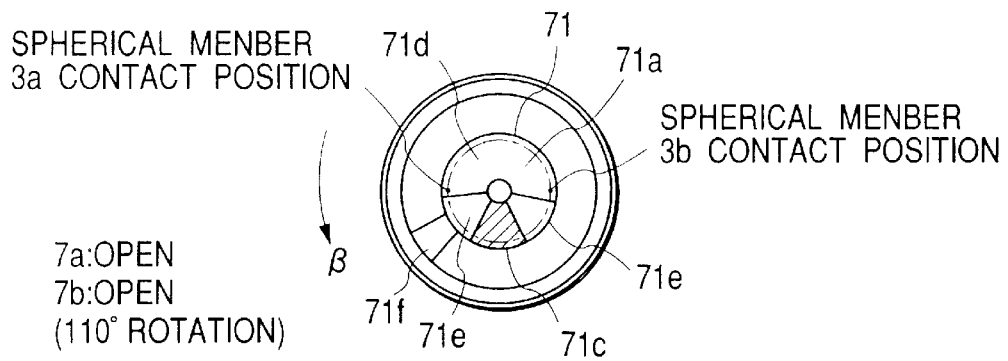
Figure 7C:
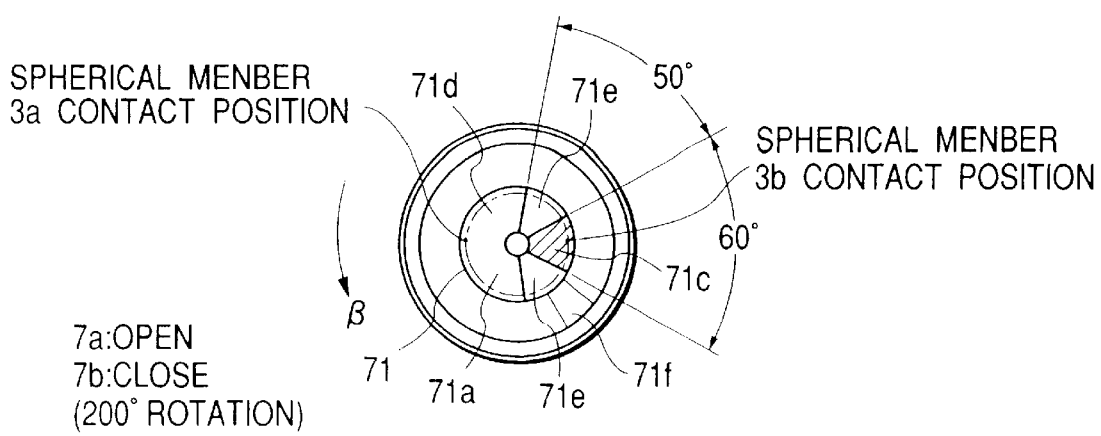

The cam face 71a, which is formed on one end of the cam member 71, drives the spherical members 3a and 3b toward the valve members 7a and 7b, and brings them into contact with and blocks the apertures (the ends of the valve members 7a and 7b). Then, to open the apertures, the cam face 71 separates the spherical members 3a and 3b from them. As is shown in FIGS. 7A to 7C, the cam face 71a includes: a projection 71c, for moving the spherical members 3a and 3b in the direction in which the apertures are closed; a low face portion 71d, for moving the spherical members 3a and 3b in the direction in which the apertures are opened; and two inclined surfaces 71e, for connecting the projection 71c and the low face portion 71d. The projection 71c of the cam face 71a is extended toward the center holes (apertures) of the valve members 7a and 7b.

When the spherical members 3a and 3b are opposite the low face portion 71d, they are separated from the valve members 7a and 7b, and the apertures of the main body 62 are released.

Further, a raised portion 71f is formed at the circumference of the other end face of the cam member 71 in order to regulate the rotation of a rotor 23. The raised portion 71f is so designed that it contacts a rotation stopper protrusion 64 that is formed on the main body 62. Since this portion is the same as the one used for the valve driving apparatus 1 in the first embodiment, no explanation for it will be given.

In a first mode shown in FIG. 7A, the spherical member 3a is pushed up toward the valve member 7a by the projection 71c on the cam member 71, and the other spherical member 3b is separated from the valve member 7b by the low face portion 71d. That is, the valve member 7a is closed and the valve member 7b is opened. The first mode shown in FIG. 7A represents the state wherein the raised portion 71f contacts the rotation stopper protrusion 64, and is positioned at the origin.

In a second mode shown in FIG. 7B, the cam member 71 is rotated 110 degrees from the first mode in the direction indicated by an arrow β. In this state, the low face portion 71d of the cam member 71 is brought into contact with the spherical members 3a and 3b in order to open the valve members 7a and 7b. That is, in the third embodiment, unlike the first and the second embodiments, both of the valve members 7a and 7b can be open at the same time, but both of them can not be closed at the same time. Since the valve members 7a and 7b can not both be closed, a phenomenon does not occur whereby the internal pressure is changed by vibration or pulsation and the valve members 7a and 7b are held closed and can not be opened. Therefore, in the third embodiment, the second cam member that is used for the first and the second embodiments is not required.

In a third mode shown in FIG. 7C, the cam member 71 is rotated 90 degrees from the second mode (200 degrees from the origin) in the direction indicated by an arrow β. In this state, the spherical member 3a is separated from the valve member 7a by the low face portion 71d of the cam member 71, and the spherical member 3b is forced against the valve member 7b by the projection 71c. Therefore, the valve member 7a is open and the valve member 7b is closed.

In the third embodiment, the main body 62 is constituted by: a brass cylindrically shaped outer frame that has a bottom; a PBT guide member 67, which is fitted inside the outer frame 63 under pressure; and the valve members 7a and 7b. Three apertures are formed in a bottom 62a of the main body 62. An inflow tube 5 and discharge tubes 6a and 6b are bonded to the three apertures by silver brazing in a hydrogen reduction furnace (in FIG. 6, a bonded portion is denoted by a W). Furthermore, a recessed bearing 63b is formed in the center of the bottom of the outer frame 63 to rotatably support one end of a rotary shaft 24 of the stepping motor 13, which will be described later.

An SUS jaw plate 70 is bonded to the rear of the main body 62 using silver brazing in a hydrogen reduction furnace (a bonded portion is denoted by W). An SUS rotor storage member 27, which has a bottom and is fixed to the jaw plate 70 using TIG welding, stores the rotor 23 of the stepping motor 13. A stator 22 is located outside the rotor storage member 27.

The guide member 67 is formed of a PBT resin mixture that has a 15% glass material content. The cam member 71, which is formed at the end of the rotor 23, and the spherical members 3a and 3b, which are valves to be driven by the cam member 71, are provided inside the guide member 67, and the thus structured guide member 67 is fitted inside the outer frame 63 under pressure. The rotation stopper protrusion 64 is also provided inside the guide member 67 to regulate the rotation of the rotor 23, and can contact the raised portion 71f that is formed on the cam member 71.

The present invention is not limited to these preferred embodiments, and can be variously modified without departing from the scope of the invention. That is, in these embodiments, the valve driving apparatus employs a so called three-way valve and has two discharge tubes connected to the main body; however, the present invention can be applied for a valve driving apparatus that has only one discharge tube connected to a main body which has only one aperture for communicating with a discharge tube.

Furthermore, in the embodiments, the projection 11c or 71c of the cam face 11a or 71a is employed to move the spherical members 3a and 3b so that they close the apertures, and the low face portion 11d or 71d is employed to move the spherical members 3a and 3b so that they open the apertures. However, the reverse operation may be performed. That is, to open the apertures, the projection 11c or 71c may move the spherical members 3a and 3b, and to close the apertures, the low face portion 11d or 71d may move the spherical members 3a and 3b.

In the embodiments, inclined surfaces are provided for the cam member (the first cam member for the first and the second embodiments) that moves the spherical members 3a and 3b relative to the valve members 7a and 7b, so that the switching operation can be smoothly performed. However, so long as the torque of the stepping motor 13 is adequate, the inclined surfaces are not required.

Further, in the embodiments, the coil springs 33a and 33b are formed so that they urge the spherical members 3a and 3b toward the cam face, and when the spherical members 3a and 3b are opposite the low face portion of the cam member, they are separated from the apertures by the force exerted by the coil springs 33a and 33b. However, when their own weights can be used to separate them from the apertures, the coil springs 33a and 33b are not required. In addition, in the first and the third embodiment, the end face of the rotor serves as the cam member. However, as in the second embodiment, the cam member may be made of a different material from the end face. Moreover, in the embodiments, although the spherical members 3a and 3b are used as valves to block the apertures, the shape of such a valve is not limited to the spherical.

Further, in the embodiments described above, the trifurcated valve shows that the two of the outlets of the trifurcated valve are controlled by two balls. As same trifurcated valve, it is applicable for controlling single outlet by single ball. Of course, the present invention is applied to the bifurcated valve having single outlet. When there is only employed the inlet or outlet to be controlled, the ball controlled portion is employed in single.

As is described above, the valve driving apparatus of the invention includes a cam member that has a cam face as a driver, and valve members are moved by the cam face of the cam member so as to open or close apertures in the main body. Thus, the screw threads that are used for a conventional valve driver are not required, and as a result, complicated operations, such as the precise machining of screw threads and the aligning of the center positions of valve members and apertures, are not required, and a simple structure can be provided whereby the apertures can be opened and closed by the valve members. Therefore, not only the number of required parts but also manufacturing expenditures, such as assembly costs, can be reduced, and mass production can be used to produce inexpensive valve driving apparatuses.

What is claimed is:
1. A valve driving apparatus comprising:
   a main body coupled with an inflow tube for introducing a fluid internally and a discharge tube for discharging said fluid;

a valve member movable within a predetermined range, said valve member permitting the opening or the closing of an aperture connected to one of said inflow tube and said discharge tube which is coupled with said main body;

a driver for driving said valve member, said driver including:

a cam member having a cam face used for operating said valve member; and a rotor attached to said cam member for rotatably driving said cam member;

a stator positioned outside of said rotor for causing said rotor to rotate; and a rotor storage member for accommodating said rotor, wherein said rotor storage member is a separate member from said stator, wherein said rotor rotates said cam member which causes the opening and closing of said aperture.

2. The valve driving apparatus according to claim 1, wherein said cam face includes a projection for moving said valve member in a direction in which said aperture is closed, and a low face portion for moving said valve member in a direction in which said aperture is opened.

3. A valve driving apparatus according to claim 2, wherein said projection and said low face portion are formed so as to be raised and recessed, respectively, in a direction orthogonal to a rotary shaft and wherein said projection and said low face portion are connected by an inclined surface.

4. A valve driving apparatus according to claim 2, wherein said cam face is located opposite said aperture, and said projection extends toward said aperture.

5. A valve driving apparatus according to claim 2, wherein said cam member is integrally formed with a rotor of a motor of said drive source, and an end face of said rotor serves as a cam face.

6. The valve driving apparatus according to claim 1, wherein said valve member is formed in a cylindrical shape and includes an arc-shaped receiving face that is shaped substantially the same as a spherical member, and wherein said spherical member is brought into contact with said aperture by said cam face to close said aperture.

7. The valve driving apparatus according to claim 1, wherein said main body includes an urging member that urges said valve members toward said cam face.

8. A valve driving apparatus according to claim 7, wherein said cam member is integrally formed with a rotor of a motor that is said drive source, and an end face of said rotor is used as said cam face, and said rotor is movable in the axial direction, and wherein, said driver includes an urging member for urging said rotor toward said main body with a force that is greater than that exerted by said urging member that urges said valve members toward said cam face.

9. A valve driving apparatus according to claim 8, wherein, when said cam member is impelled by said urging member that urges said cam member toward said main body, said valve member is urged toward said aperture by said projection.

10. A valve driving apparatus according to claim 2, wherein said projection and said low face portion are formed so as to be raised and recessed, respectively, in a direction orthogonal to a rotary shaft, and further comprising:

a spherical member for opening and closing said aperture;

moving means for moving said spherical member in a direction perpendicular to the direction in which said spherical member is moved to open or close said aperture when said low face portion of said cam face is opposite said spherical member.

11. The valve driving apparatus according to claim 1, wherein said valve member opens and closes an opening side, which is connected to said discharging tube.

\* \* \* \* \*